D. MORIARTY.
VEHICLE WHEEL.
APPLICATION FILED NOV. 5, 1913.
1,114,506.
Patented Oct. 20, 1914.
2 SHEETS—SHEET 1.
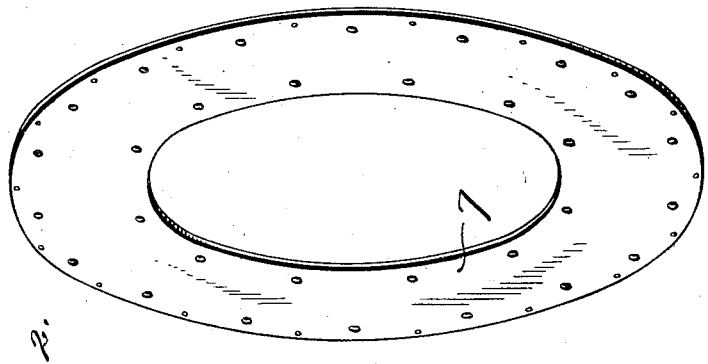
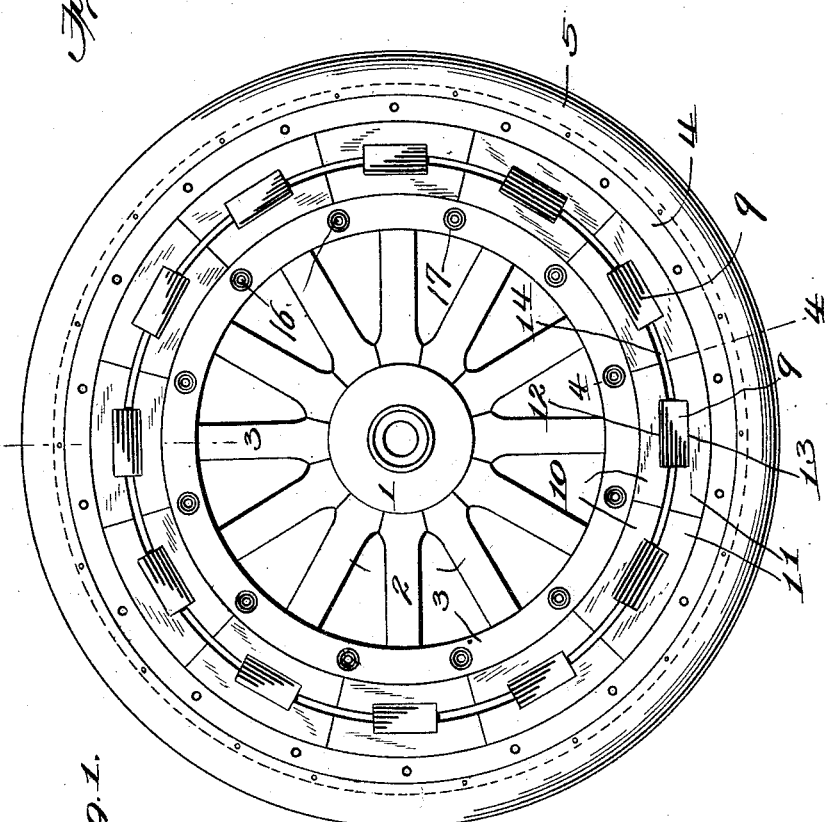

D. MORIARTY.
VEHICLE WHEEL.
APPLICATION FILED NOV. 5, 1913.
1,114,506.
Patented Oct. 20, 1914.
2 SHEETS—SHEET 2.
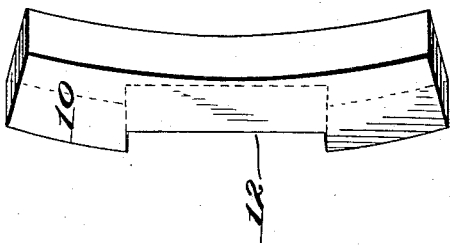
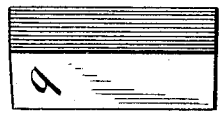
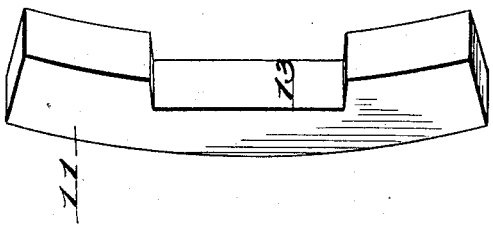
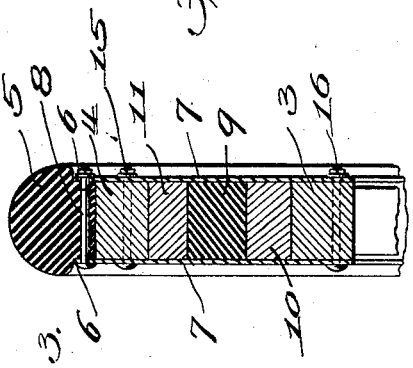
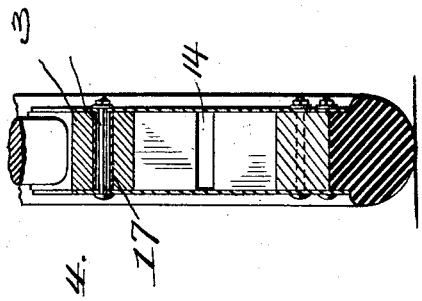
Witnesses:
Inventor
Daniel Moriarty,
by
James L. Norris,
Attorney.

UNITED STATES PATENT OFFICE.

DANIEL MORIARTY, OF NEW ORLEANS, LOUISIANA.

VEHICLE-WHEEL.

1,114,506.  Specification of Letters Patent.  Patented Oct. 20, 1914.

Application filed November 5, 1913.  Serial No. 799,367.

*To all whom it may concern:*

Be it known that I, DANIEL MORIARTY, a citizen of the United States, residing at New Orleans, in the parish of Orleans and State of Louisiana, have invented new and useful Improvements in Vehicle-Wheels, of which the following is a specification.

My present invention relates to improvements in resilient wheels of the type adapted for use upon automobiles and the like to avoid the necessity of employing pneumatic tires which, as well known, are open to many objections, and the primary object of this invention is to provide a resilient wheel which is practical, durable, and otherwise capable of fulfilling the requirements imposed thereon, especially when used upon automobiles and other heavy vehicles, the wheel embodying a series of cushions of flexible or elastic material which are applied and held in position under pressure, thus enabling them to sustain the relatively heavy weight of the vehicle and yet yield and afford the desired cushioning effect, these cushions being so mounted that displacement or deformation thereof is avoided, and means is provided for confining and protecting the cushions at the sides of the wheel, mud, water, or other substances that would injuriously affect the cushions or interfere with their action being effectively excluded, and such means also connects the inner and outer fellies or members of the wheel.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is an elevation of a resilient wheel constructed in accordance with the preferred embodiment of my invention, the cover plate or disk being removed; Fig. 2 is a perspective view of the removed disk or cover plate; Fig. 3 represents on an enlarged scale a transverse section through the wheel on the line 3—3 of Fig. 1; Fig. 4 is a view similar to Fig. 3, the section being taken on the line 4—4 of Fig. 1; Figs. 5, 6 and 7 are perspective views showing one of the cushions and its mounting.

Similar parts are designated by the same reference characters in the several views.

Resilient wheels embodying the present invention are capable of use upon vehicles of different kinds, although they are especially adapted for use upon automobiles primarily to avoid the necessity of employing pneumatic tires.

The preferred construction is shown in the drawings and will be hereinafter described in detail, but it is to be understood that modifications and changes may be made in order to adapt the wheel to meet different requirements, such modifications and changes to be within the scope of the claims at the end of the specification.

In the construction shown, the wheel embodies a rigid inner member which is composed of the hub 1, the spokes 2, and the inner felly 3. These parts can be assembled and firmly united according to the usual construction of wheels of the type employed on automobiles, although of course other types of construction could be used. The outer member of the wheel is composed of an outer felly or rim 4 and a tire 5 mounted on the periphery thereof. The tire is composed preferably of solid rubber of suitable composition while the inner and outer fellies can be made advantageously of wood. It is preferable to hold or secure the tire in position upon the outer felly by means such as that shown, the outer portion of the tire being wider than the fellies but being reduced somewhat adjacent to its inner circumference by forming grooves 6 therein. A pair of disks or cover plates 7 applied to the opposite sides of the fellies have their outer edges projecting beyond the circumference of the outer felly 4, and a suitable number of bolts 8 are passed through the reduced portion of the tire and through the projecting edges of the disks or plates 7 at suitable intervals around the wheel, and when these bolts are tightened, the tire will be positively and firmly clamped and held in position upon the felly. By securing the tire in position in this way, longer service is obtained, as stripping of the tire from the wheel is avoided.

The inner and outer fellies are of different diameters, providing a space of suitable size between them to accommodate the cushioning means. The cushioning means shown in the present instance and embodying my invention are composed of a series of blocks 9 of flexible or elastic material, preferably relatively soft rubber, such blocks being spaced equidistantly in a direction circumferentially of the annular space between the inner and outer fellies, thus forming a circular series. These cushioning blocks are mounted and held in proper position between inner and outer pocketed or recessed rings.

In the construction shown, the inner ring is composed of segmental sections 10, and the outer ring is composed of complemental segmental sections 11, the sections of the inner and outer rings completely filling the annular space between the fellies. The inner ring sections are formed on their outer sides with recesses 12, and the outer ring sections are formed on their inner sides with recesses 13, the recesses of the inner and outer ring sections being positioned directly opposite to one another to form a pocket to accommodate the flexible or elastic cushion. A clearance space 14 is formed between the inner and outer rings to permit relative movement between the fellies under the flexible or resilient action of the cushions. Preferably, the blocks of flexible or resilient material composing the cushions are of solid rectangular form and the recesses in which the blocks are seated are of corresponding form.

In assembling the wheel, the inner and outer sectional rings 10 and 11 are inserted between the inner and outer fellies, and the cushion blocks 9 of flexible or resilient material are cut of a size larger than the recesses or pockets into which they are to be inserted. The blocks are forced laterally into the respective pockets by pressure, and this can be facilitated by first wetting the blocks with water. By making the cushion blocks of a size larger than the pockets into which they are inserted and then inserting them under pressure, all the cushions of the circular series will be initially under considerable pressure and hence they are able to sustain the normal weight of the vehicle on which the wheels are used. Obviously, the amount of compression and also the size of the blocks can be varied according to the weight of the vehicle on which the wheels are to be used. The resilient action of the blocks due to irregularities in the ground or road surface takes place without interference owing to the clearance space 14 which is provided between the inner and outer rings.

The cushion blocks and also the sectional rings in which they are mounted are confined at the sides by the disks or cover plates 7, the blocks and rings corresponding preferably in width to the width of the inner and outer fellies. The disks or cover plates 7 are shown secured firmly to the outer felly by bolts 15 which extend through the disks and said felly, and the inner portions of the disks are held together by a suitable number of circumferentially spaced bolts 16 which extend through the disks and the inner felly 3. Owing to the resilience or flexibility of the cushion blocks 9, relative movement occurs between the inner and outer fellies, and where, as in the present instance, the disks or cover plates 7 are fixed to the outer felly 4 and to the tire, provision is made for the bolts 16 whereby these will not interfere with such movement. Preferably, these bolts 16 pass through tubes 17 which extend laterally through the inner felly, these tubes having openings of a size larger than the bolts and thereby permit the bolts 16 to move around freely within them, it being understood that the disks or cover plates 7 have a sliding relation to the sides of the inner felly. These disks or cover plates not only connect the inner and outer fellies and confine the cushion blocks and the rings in which they are mounted, but they also effectively exclude mud, water, oil or other substances which might injure or interfere with the action of the flexible or resilient cushions.

I claim as my invention:—

1. In a resilient wheel, the combination of inner and outer members spaced radially and provided with opposed recesses arranged in pairs to form pockets having substantially radial shoulders at their ends, and blocks of flexible material each contained in the pocket formed by the respective pair of recesses and abutting against said shoulders at the ends thereof, said blocks being coextensive with the width of said members.

2. In a resilient wheel, the combination with inner and outer fellies, inner and outer segmental members interposed between said fellies and having pairs of complemental recesses having substantially right angular end walls between the ends of the respective members, a body of flexible or yieldable material filling the recesses of each pair and abutting against said end walls, and disks applied to opposite sides of said fellies and confining and protecting said flexible bodies.

3. In a resilient wheel, the combination of inner and outer fellies, inner and outer sets of segmental members interposed between said fellies and formed with pairs of complemental opposed recesses, bodies of flexible material contained one in each pair of recesses, said bodies being of the same width as said members a tire applied to the periphery of the outer felly, and disks fixed to opposite sides of the outer felly and to the tire engaging and retaining said members and bodies and overlapping and movably connected to the inner felly.

In testimony whereof I have hereunto set my hand in presence of two subscribing witnesses.

DANIEL MORIARTY.

Witnesses:
C. O. BATEMAN,
CHAS. S. HYER.

Copies of this patent may be obtained for five cents each, by addressing the "Commissioner of Patents, Washington, D. C."